(12) United States Patent
Togashi

(10) Patent No.: US 10,381,711 B2
(45) Date of Patent: Aug. 13, 2019

(54) ELECTRONIC DEVICE

(71) Applicant: KYOCERA Corporation, Kyoto (JP)

(72) Inventor: Daisuke Togashi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/462,972

(22) Filed: Mar. 20, 2017

(65) Prior Publication Data

US 2017/0279183 A1    Sep. 28, 2017

(30) Foreign Application Priority Data

Mar. 24, 2016    (JP) .................. 2016-060456

(51) Int. Cl.

| | |
|---|---|
| *H01Q 1/24* | (2006.01) |
| *H01Q 1/22* | (2006.01) |
| *H01Q 1/27* | (2006.01) |
| *H01Q 1/44* | (2006.01) |
| *H01Q 21/30* | (2006.01) |
| *G02C 7/10* | (2006.01) |
| *G02C 11/00* | (2006.01) |

(52) U.S. Cl.
CPC .............. *H01Q 1/2291* (2013.01); *G02C 7/10* (2013.01); *G02C 11/10* (2013.01); *H01Q 1/245* (2013.01); *H01Q 1/273* (2013.01); *H01Q 1/44* (2013.01); *H01Q 21/30* (2013.01)

(58) Field of Classification Search
CPC ........ H01Q 1/243; H01Q 1/38; H01Q 9/0421; H01Q 1/273; H01Q 7/00
USPC ................. 343/702, 718, 872, 878
See application file for complete search history.

(56) References Cited

U.S. PATENT DOCUMENTS

| | | | |
|---|---|---|---|
| 3,383,682 A | 5/1968 | Stephens, Jr. | |
| 7,527,375 B2 | 5/2009 | Blum et al. | |
| 7,769,348 B2 * | 8/2010 | Angelhag .......... | H04N 5/23293 455/41.2 |
| 7,971,994 B2 | 7/2011 | Blum et al. | |
| 8,351,636 B2 | 1/2013 | Ritter et al. | |
| 8,408,699 B2 | 4/2013 | Blum et al. | |
| 9,024,830 B2 | 5/2015 | Okajima et al. | |
| 2007/0160254 A1 | 7/2007 | Ritter et al. | |
| 2007/0296918 A1 | 12/2007 | Blum et al. | |
| 2008/0239452 A1 * | 10/2008 | Xu .................... | G02C 7/101 359/265 |

(Continued)

FOREIGN PATENT DOCUMENTS

| | | |
|---|---|---|
| EP | 2775627 A1 | 9/2014 |
| JP | H11-353444 A | 12/1999 |

(Continued)

OTHER PUBLICATIONS

Extended European Search Report issued by the European Patent Office dated Aug. 1, 2017, which corresponds to EP17161944.8-1927 and is related to U.S. Appl. No. 15/462,972.

*Primary Examiner* — Dameon E Levi
*Assistant Examiner* — Collin Dawkins
(74) *Attorney, Agent, or Firm* — Studebaker & Brackett PC

(57) ABSTRACT

This electronic device is used by being worn on a user's head. The electronic device includes lens portions positioned in front of the user's eyes when the electronic devices is worn on the head of the user, a first antenna formed in one lens portion, and a second antenna formed in the other lens portion. The first antenna and the second antenna have different functions.

14 Claims, 7 Drawing Sheets

(56) References Cited

U.S. PATENT DOCUMENTS

| | | | |
|---|---|---|---|
| 2009/0115961 A1 | 5/2009 | Blum et al. | |
| 2011/0228212 A1 | 9/2011 | Blum et al. | |
| 2012/0328134 A1 | 12/2012 | Lewis | |
| 2013/0194141 A1* | 8/2013 | Okajima | G02C 11/10 343/718 |
| 2014/0240474 A1* | 8/2014 | Kondo | H01Q 9/16 348/56 |

FOREIGN PATENT DOCUMENTS

| | | |
|---|---|---|
| JP | 2009-541793 A | 11/2009 |
| JP | 2013-513275 A | 4/2013 |
| JP | 2013-090061 A | 5/2013 |
| JP | 2014-063166 A | 4/2014 |
| JP | 2015-154276 A | 8/2015 |
| WO | 96/00401 A1 | 1/1996 |
| WO | 2012/086619 A1 | 6/2012 |

* cited by examiner

ELECTRONIC DEVICE

CROSS REFERENCE TO RELATED APPLICATION

This application claims priority to and the benefit of Japanese Patent Application No. 2016-060456 (filed on Mar. 24, 2016), the entire contents of which are incorporated herein by reference.

TECHNICAL FIELD

This disclosure relates to an electronic device.

BACKGROUND

In recent years, wearable terminals that can be used by being worn on the user's body have become more widespread. As examples of wearable terminals, JP 2013-90061 A (PTL 1), JP H11-353444 A (PTL 2), and JP 2013-513275 A (PTL 3) disclose electronic devices.

CITATION LIST

Patent Literature

PTL 1: JP 2013-90061 A
PTL 2: JP H11-353444 A
PTL 3: JP 2013-513275 A

SUMMARY

Wireless communication devices that are worn on the user's body need to have a Specific Absorption Rate (SAR) equal to or less than a certain threshold. In the electronic devices in PTL 1 to 3, however, the antenna of the wireless communication device that transmits and receives radio waves is in close contact with the user's head. Therefore, the SAR might increase above the threshold. Also, the user's head interferes with radio propagation of the wireless communication device that is worn on the user's body, easily leading to a loss in radio performance.

Therefore, it would be helpful to provide an electronic device that can reduce the SAR and perform better radio communication.

An electronic device according to one of the embodiments of this disclosure is used by being worn on the head of a user, the electronic device including: a lens portion positioned in front of eyes of the user when the electronic device is worn on the head of the user; a first antenna formed in the lens portion; and a second antenna formed in the lens portion; such that the first antenna and the second antenna have different functions.

According to the electronic device of this disclosure, the SAR can be reduced, and better radio communication can be performed.

BRIEF DESCRIPTION OF THE DRAWINGS

In the accompanying drawings.

DETAILED DESCRIPTION

The following describes embodiments of electronic devices according to this disclosure with reference to the drawings.

[Structure of Electronic Device]

Figure 1:
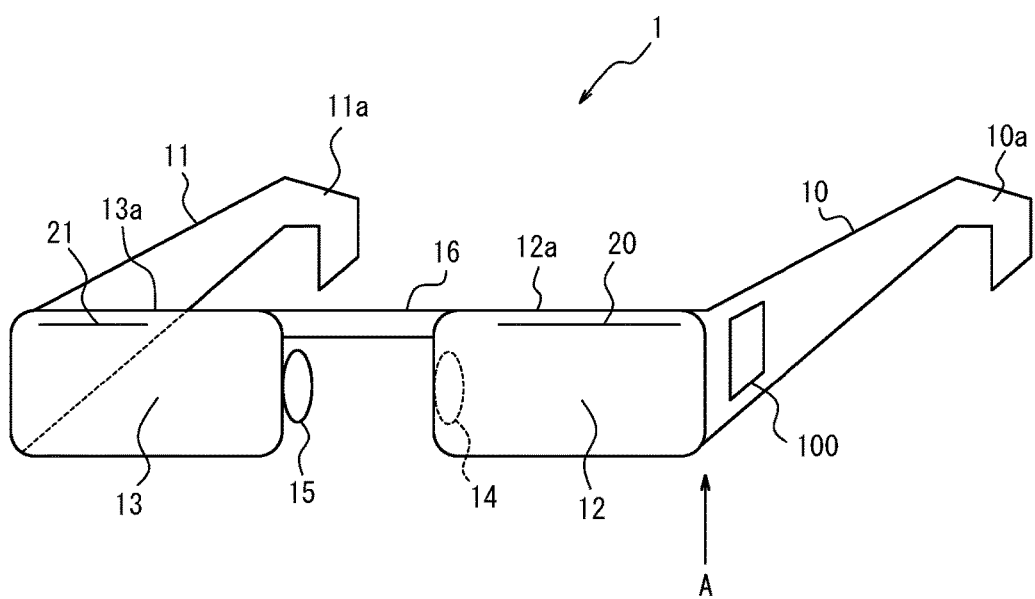
FIG. 1 is a perspective view illustrating the structure of an embodiment of an electronic device according to this disclosure.

FIG. 1 is a perspective view illustrating the structure of an embodiment of an electronic device according to this disclosure. As illustrated in FIG. 1, the electronic device of this embodiment has the structure of a wireless communication device in the shape of eyeglasses.

The electronic device 1 includes temples 10 and 11, a lens portion (first lens portion) 12, a lens portion (second lens portion) 13, nose pads 14 and 15, a bridge 16, an antenna (first antenna) 20, an antenna (second antenna) 21, and a control circuit 100. In FIG. 1, feeders and the like are omitted from the drawing.

The temples 10 and 11 are positioned on the sides of the user's head when the user is wearing the electronic device 1 (state of wearing by the user). The temple 10 is disposed on the left side of the user's head, and the temple 11 is disposed on the right side of the user's head.

The temple 10 has an earpiece 10a at the tip thereof. The temple 11 has an earpiece 11a at the tip thereof. The earpiece 10a rests on the user's left ear in the state of wearing by the user. The earpiece 11a rests on the user's right ear in the state of wearing by the user.

The lens portion 12 is connected to the temple 10 at one edge and to the bridge 16 at the other edge. The lens portion 13 is connected to the temple 11 at one edge and to the bridge 16 at the other edge.

The lens portion 12 is positioned in front of the user's left eye in the state of wearing by the user. The lens portion 13 is positioned in front of the user's right eye in the state of wearing by the user. A rim 12a surrounds the border of the lens portion 12, and a rim 13a surrounds the border of the lens portion 13.

The nose pad 14 is provided on the bridge 16 side of the lens portion 12. The nose pad 15 is provided on the bridge 16 side of the lens portion 13. In the state of wearing by the user, the nose pad 14 touches the left side of the user's nose. In the state of wearing by the user, the nose pad 15 touches the right side of the user's nose.

The bridge 16 maintains the left and right lens portions 12 and 13 in a predetermined positional relationship by connecting the lens portions 12 and 13.

The antenna 20 is formed on the lens surface of the lens portion 12. The antenna 21 is formed on the lens surface of the lens portion 13. A configuration may be adopted in which the antenna 20 and the antenna 21 are only formed on one of the lens portion 12 and the lens portion 13. The antenna 20 and the antenna 21 may be formed by, for example, printing a pattern of transparent electrode film, metal foil, or the like on the lens. In this embodiment, transparent electrode film is used as the antenna 20 and the antenna 21.

The control circuit 100 controls transmission and reception of radio waves using the antenna 20 and the antenna 21. The control circuit 100 is disposed in the temple 10 but may instead be disposed in the temple 11 or another location. For example, the control circuit 100 may be disposed in the rims 12a and 13a, in the nose pads 14 and 15, or in a fastener for the lens portions 12 and 13 (not illustrated, but located at the position indicated by arrow A).

Two control circuits may be prepared, i.e. a first control circuit for controlling transmission and reception of radio waves by the antenna 20 and a second control circuit for controlling transmission and reception of radio waves by the antenna 21.

Figure 2:
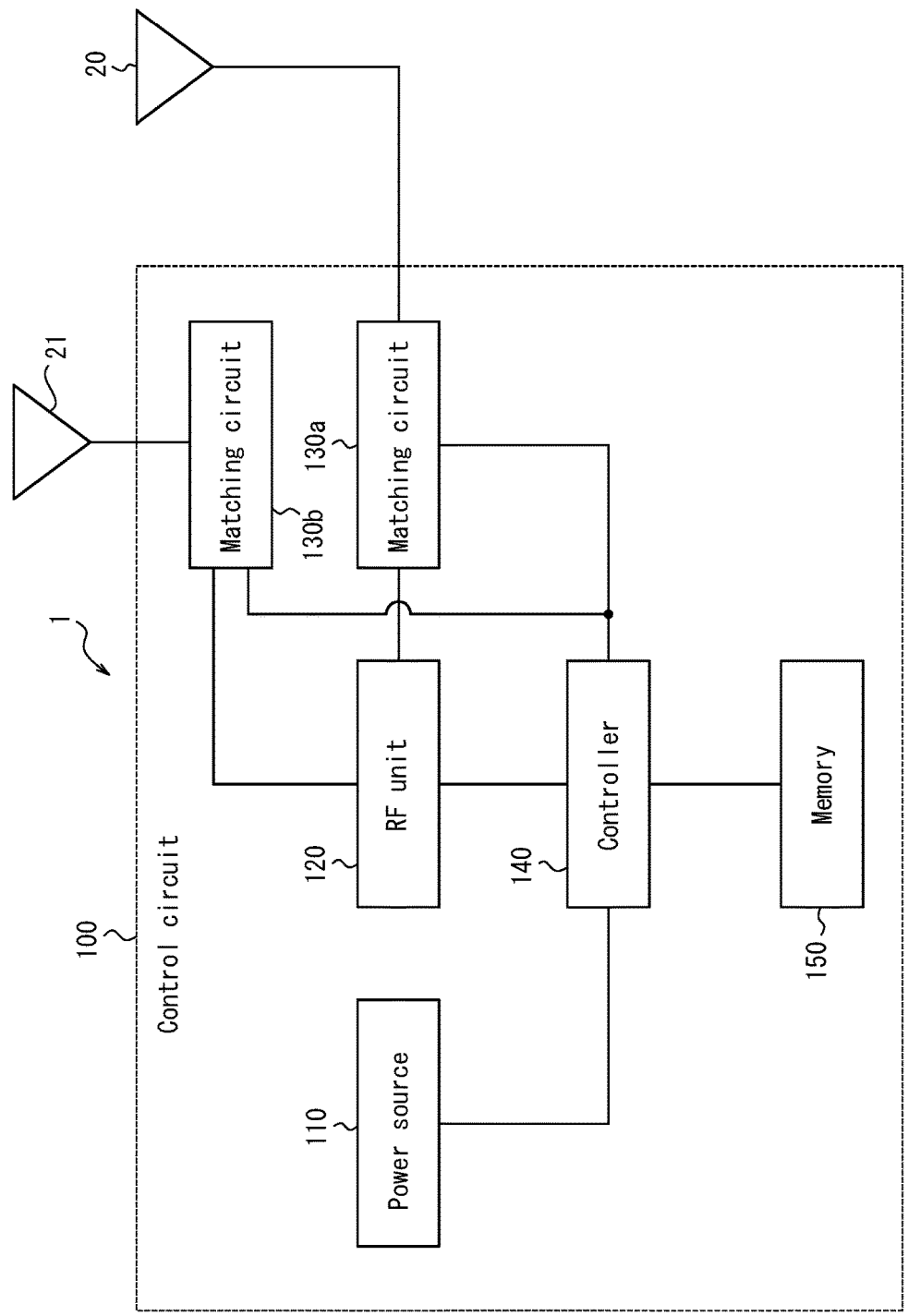
FIG. 2 is a functional block diagram illustrating the circuit structure of the electronic device illustrated in FIG. 1.

With reference to FIG. 2, the following schematically describes the structure of the control circuit 100. FIG. 2 is a functional block diagram illustrating the circuit structure of the electronic device illustrated in FIG. 1.

The control circuit 100 includes a power source 110, a Radio Frequency (RF) unit 120, matching circuits 130a and 130b, a controller 140, and a memory 150.

The power source 110 may, for example, be configured using a rechargeable secondary battery. The power source 110 supplies power to the RF unit 120, the controller 140, the memory 150, and the like. In the example in FIG. 2, only the connection between the power source 110 and the controller 140 is depicted to simplify the drawing, but the power source 110 is actually connected electronically to each of the elements in the control circuit 100 and supplies power to each of the elements. The power source 110 is included in the control circuit 100 in FIG. 2, but the power source 110 may be disposed at a different location than the control circuit 100 in the electronic device 1.

The RF unit 120 modulates a transmission signal output from the controller 140 and outputs the result to the antenna 20 or the antenna 21 via a non-illustrated switch. The RF unit 120 also modulates a received signal acquired from the antenna 20 or the antenna 21 and outputs the result to the controller 140.

The matching circuit 130a adjusts the impedance within the matching circuit 130a based on a control signal from the controller 140 so as to match the impedance of the antenna 20 to the impedance of the circuit forming the control circuit 100. Also, the matching circuit 130b adjusts the impedance within the matching circuit 130b based on a control signal from the controller 140 so as to match the impedance of the antenna 21 to the impedance of the circuit forming the control circuit 100. Upon matching the impedance of the antenna 20 and the antenna 21 to the impedance of the circuit forming the control circuit 100, the reflection in the control circuit 100 of the received signal from the antenna 20 and the antenna 21 is reduced, and the intensity of the received signal processed by the controller 140 increases. The impedance within the matching circuits 130a and 130b need not be adjustable by a control signal from the controller 140 and may be fixed.

The controller 140 controls and manages the electronic device 1 overall and may, for example, be configured using a processor. The controller 140 implements a variety of functions by reading and executing programs stored in the memory 150.

The controller 140 demodulates the received signal acquired from the RF unit 120. The controller 140 also outputs a transmission signal to be transmitted from the antenna 20 or the antenna 21 to the RF unit 120. By, for example, outputting a control signal to the matching circuits 130a and 130b to cause the matching circuits 130a and 130b to adjust the impedance in the matching circuits 130a and 130b, the controller 140 causes the matching circuits 130a and 130b to match the impedance of the antennas 20 and 21 to the impedance of the circuit forming the control circuit 100.

The memory 150 stores information necessary for processing by the controller 140 and a program with a description of processing to implement the functions of the controller 140.

Figure 3:
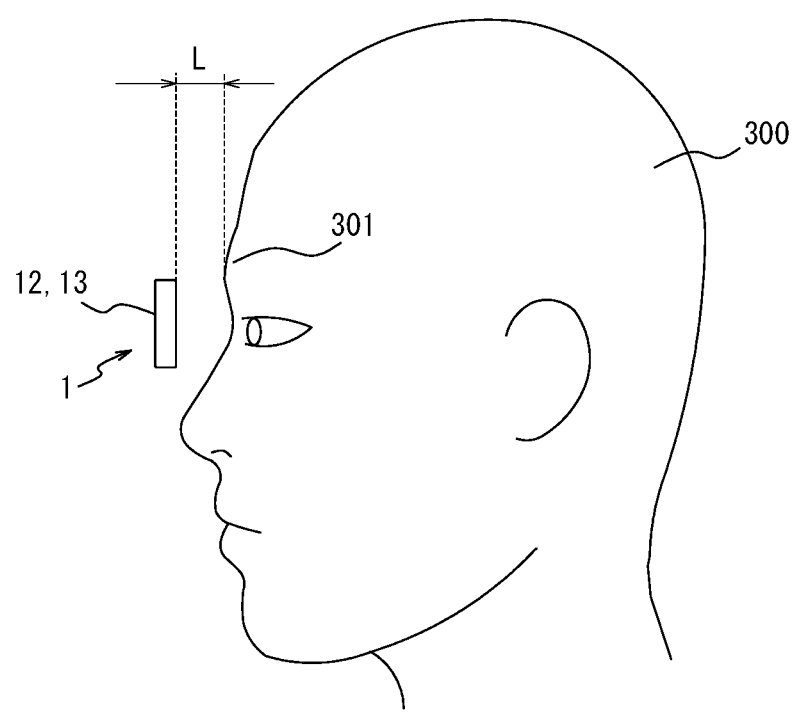
FIG. 3 is a conceptual diagram of when the user wears the electronic device illustrated in FIG. 1.

Next, with reference to FIG. 3, the case of the user wearing the electronic device 1 illustrated in FIG. 1 is described. FIG. 3 is a conceptual diagram of when the user wears the electronic device 1 illustrated in FIG. 1. In the example illustrated in FIG. 3, in order to simplify the drawing, only the relationship between the lens portions 12 and 13 in the electronic device 1 and the user's head is illustrated, with the relationship to the temples 10 and 11, rims 12a and 13a, and the like illustrated in FIG. 1 being omitted.

As illustrated in FIG. 3, when a user 300 wears the electronic device 1, the lens portions 12 and 13 of the electronic device 1 are positioned away from the forehead 301 of the user 300 by a fixed distance L.

In this way, by disposing the antennas 20 and 21 in the lens portions 12 and 13 that do not directly contact the user's head, the SAR can be reduced in the electronic device 1.

Also, by disposing the antennas 20 and 21 in the lens portions 12 and 13 that are separated from the user's head by a predetermined distance (the distance L in the example in FIG. 3), interference with radio propagation by the user's head can be reduced, improving performance related to transmission and reception of radio waves by the antennas 20 and 21.

Forming the antennas 20 and 21 by printing a lightweight antenna pattern contributes to a reduction in weight of the electronic device 1. Since the antennas 20 and 21 are formed in the lens portions 12 and 13 by printing, without providing a new member for arrangement of the antennas, the design of the electronic device 1 can be preserved well. By forming the antennas 20 and 21 from a transparent electrode film, for example, the design of the electronic device 1 can be preserved even better.

The antenna 20 is a directional antenna for transmission, and the antenna 21 is an omnidirectional antenna for reception. In other words, the antennas 20 and 21 have different functions. By setting the antenna 20 to be a directional antenna for transmission and the antenna 21 to be an omnidirectional antenna for reception, in this embodiment transmission with good directionality in a desired direction can be performed when transmitting, and an efficient standby state that is not affected by directionality can be achieved when receiving.

The different functions of the antennas 20 and 21 may, for example, be set in accordance with the intended use of the electronic device 1.

For example, when the electronic device 1 is used in a communication method based on MIMO or diversity, the antenna 20 may be a main antenna, and the antenna 21 may be a sub-antenna. By setting the antenna 20 of the lens portions 12 to be the main antenna and the antenna 21 of the lens portion 13 to be the sub-antenna, isolation between the main antenna and the sub-antenna can be sufficiently guaranteed, since the lens portions 12 and 13 are separated from each other. Of course, the antenna 21 may be the main antenna, and the antenna 20 may be the sub-antenna.

For example, when the electronic device 1 is used in a plurality of communication methods, the antenna 20 may be a Wide Area Network (WAN) antenna, and the antenna 21 may be a Wireless Local Area Network (WLAN) antenna. By setting the antenna 20 of the lens portions 12 to be a WAN antenna and the antenna 21 of the lens portion 13 to be a WLAN antenna, interference between the antennas 20 and 21 can be reduced, since the lens portions 12 and 13 are separated from each other. The antenna 21 may be a WAN antenna, and the antenna 20 may be a WLAN antenna.

In this way, by providing the electronic device 1 with the antennas 20 and 21 that have different functions, the electronic device 1 can be applied to a variety of uses, such as communication methods based on MIMO or diversity.

The lens portions 12 and 13 may include colored lenses for sunglasses. By using lenses for sunglasses as the lens portions 12 and 13, the antennas 20 and 21 become even less noticeable, and the design of the electronic device 1 can be preserved even better.

The antennas 20 and 21 may have any shape and may be formed at any location in the lens portions 12 and 13. For example, by forming the antennas 20 and 21 at the outer perimeter of the lenses in the lens portions 12 and 13, a good field of view can be maintained.

The antennas 20 and 21 have been indicated above as having different functions from each other, but the antennas 20 and 21 may have the same function.

As described above, an electronic device according to one of the embodiments of this disclosure includes the lens portions 12 and 13 positioned in front of the user's left and right eyes, the antenna 20 is printed on the lens surface of the lens portion 12, and the antenna 21 is printed on the lens surface of the lens portion 13. By disposing the antennas 20 and 21 in the lens portions 12 and 13 that are separated from the user's head by a predetermined distance, the SAR due to the radio waves of the antennas 20 and 21 can be reduced. Also, by providing the electronic device 1 with the antennas 20 and 21 that have different functions, the electronic device 1 can be applied to a variety of uses, such as communication methods based on MIMO or diversity.

[Modification 1]

Figure 4:
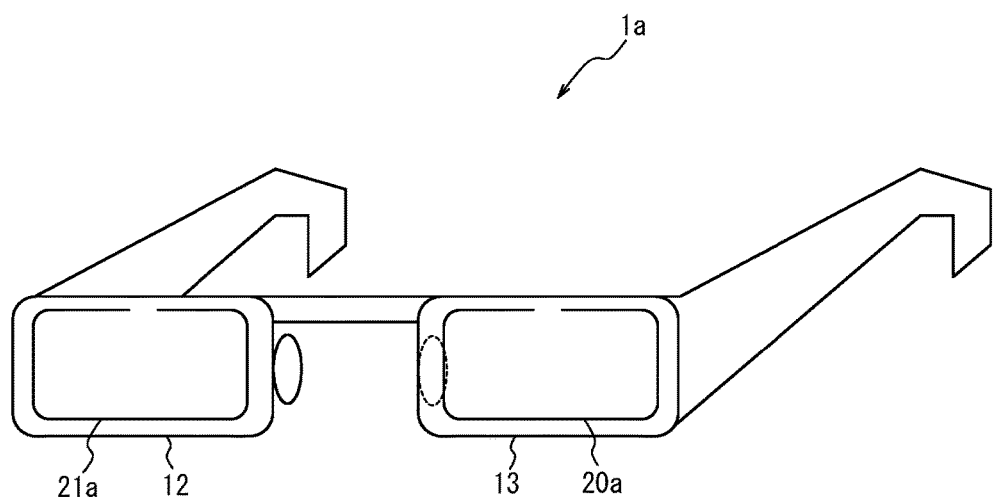
FIG. 4 is a perspective view illustrating the structure of an electronic device in Modification 1 to an embodiment of an electronic device according to this disclosure.

With reference to FIG. 4, the following describes an electronic device in Modification 1 as an embodiment of an electronic device according to this disclosure. FIG. 4 is a perspective view illustrating the structure of an electronic device in Modification 1 as an embodiment of an electronic device according to this disclosure. Modification 1 below only differs from the configuration of the electronic device illustrated in FIG. 1 in the structure of the antennas 20 and 21. Therefore, only this difference is described.

As illustrated in FIG. 4, in an electronic device 1a of Modification 1, an antenna 21a formed in the lens portion 12 is formed around substantially the entire perimeter along the edge of the lens portion 12. Also, in Modification 1, an antenna 20a formed in the lens portion 13 is formed around substantially the entire perimeter along the edge of the lens portion 13. In other words, in Modification 1, the antenna 20a is used instead of the antenna 20 illustrated in FIG. 1, and the antenna 21a is used instead of the antenna 21 illustrated in FIG. 1.

By adopting this configuration, the electronic device 1a of Modification 1 achieves similar effects to those of the electronic device 1 in the above-described embodiment while also guaranteeing the length of the antennas 20a and 21a and allowing support for radio waves over a wide band of frequencies. A configuration may also be adopted in which one of the antennas 21a and 20a is formed around substantially the entire perimeter along the edge of the lens, as illustrated in FIG. 4.

[Modification 2]

Figure 5:
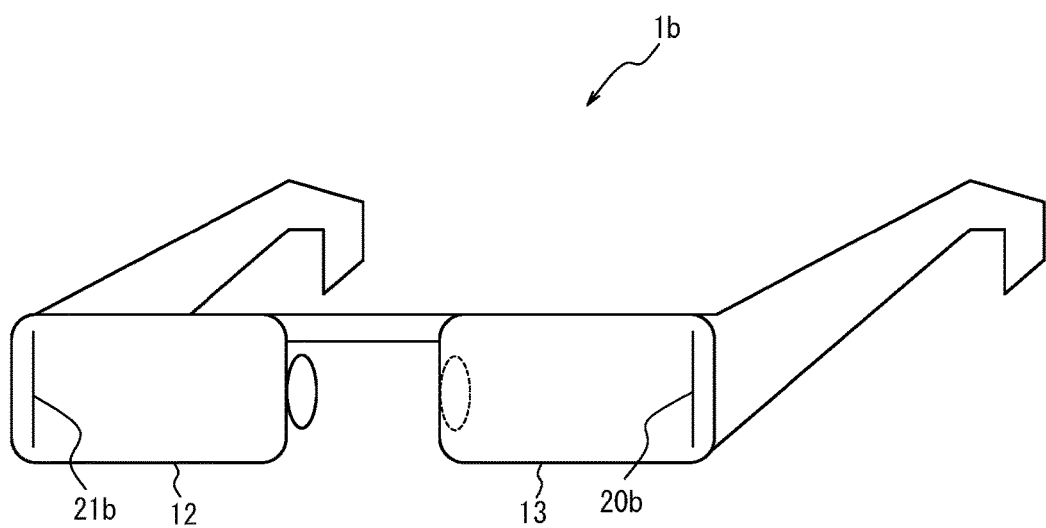
FIG. 5 is a perspective view illustrating the structure of an electronic device in Modification 2 to an embodiment of an electronic device according to this disclosure.

With reference to FIG. 5, the following describes an electronic device in Modification 2 as an embodiment of an electronic device according to this disclosure. FIG. 5 is a perspective view illustrating the structure of an electronic device in Modification 2 as an embodiment of an electronic device according to this disclosure. An electronic device 1b of Modification 2 below only differs from the configuration of the electronic device illustrated in FIG. 1 in the structure of the antennas 20 and 21. Therefore, only this difference is described.

As illustrated in FIG. 5, in the electronic device 1b of Modification 2, an antenna 21b formed in the lens portion 12 is formed at an edge of the lens portion 12 in the direction opposite the direction from the lens portion 12 towards the other lens portion 13. In the electronic device 1b of Modification 2, an antenna 20b formed in the lens portion 13 is formed at an edge of the lens portion 13 in the direction opposite the direction from the lens portion 13 towards the other lens portion 12. In other words, in Modification 2, the antenna 20b is used instead of the antenna 20 illustrated in FIG. 1, and the antenna 21b is used instead of the antenna 21 illustrated in FIG. 1.

By adopting this configuration, the electronic device 1b of Modification 2 achieves similar effects to those of the electronic device 1 in the above-described embodiment while also guaranteeing the distance between the antenna 20b and the antenna 21b and improving the diversity performance of both antennas. A configuration may also be adopted in which one of the antennas 21b and 20b is formed at an edge of the lens portion in the direction opposite the direction towards the other lens portion, as illustrated in FIG. 5.

[Modification 3]

Figure 6:
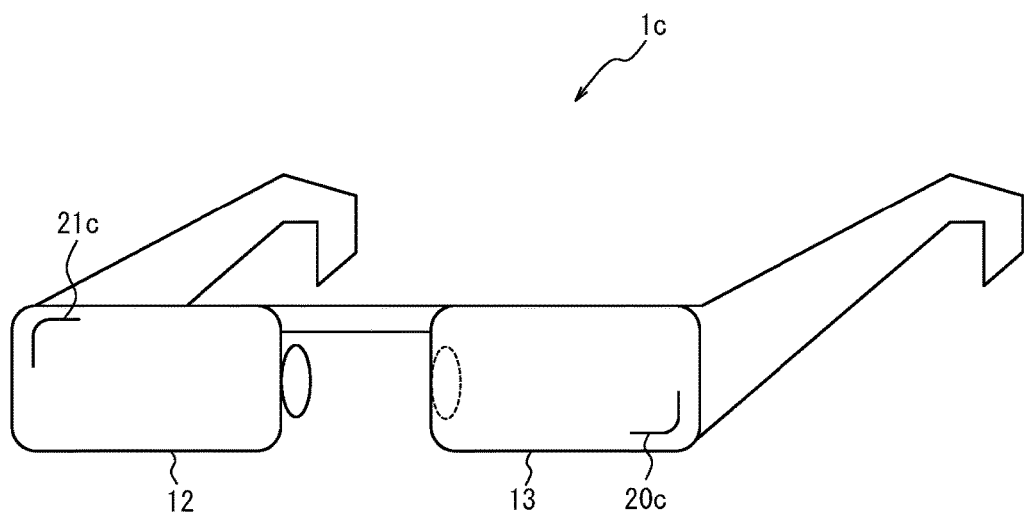
FIG. 6 is a perspective view illustrating the structure of an electronic device in Modification 3 to an embodiment of an electronic device according to this disclosure.

With reference to FIG. 6, the following describes an electronic device in Modification 3 as an embodiment of an electronic device according to this disclosure. FIG. 6 is a perspective view illustrating the structure of an electronic device in Modification 3 as an embodiment of an electronic device according to this disclosure. Modification 3 below only differs from the configuration of the electronic device illustrated in FIG. 1 in the structure of the antennas 20 and 21. Therefore, only this difference is described.

As illustrated in FIG. 6, in the electronic device 1c of Modification 3, an antenna 21c formed in the lens portion 12 is formed in a corner of the lens portion 12 in the direction opposite the direction from the lens portion 12 towards the other lens portion 13. In Modification 3, an antenna 20c formed in the lens portion 13 is formed in a corner in the direction opposite the direction from the lens portion 13 towards the other lens portion 12. The corner as referred to here is a position on the lens that is at an edge of the lens portion in the direction opposite the direction from the lens portion towards the other lens portion and at an edge of the lens portion in a direction perpendicular to the direction from the lens portion towards the other lens portion. In other words, in Modification 3, the antenna 20c is used instead of the antenna 20 illustrated in FIG. 1, and the antenna 21c is used instead of the antenna 21 illustrated in FIG. 1.

By adopting this configuration, Modification 3 achieves similar effects to those of the electronic device 1 in the above-described embodiment while also guaranteeing the distance between the antenna 20c and the antenna 21c and improving the diversity performance of both antennas. A configuration may also be adopted in which one of the antennas 21*b* and 20*b* is formed in a corner of the lens portion in the direction opposite the direction towards the other lens portion, as illustrated in FIG. 6.

[Modification 4]

Figure 7:
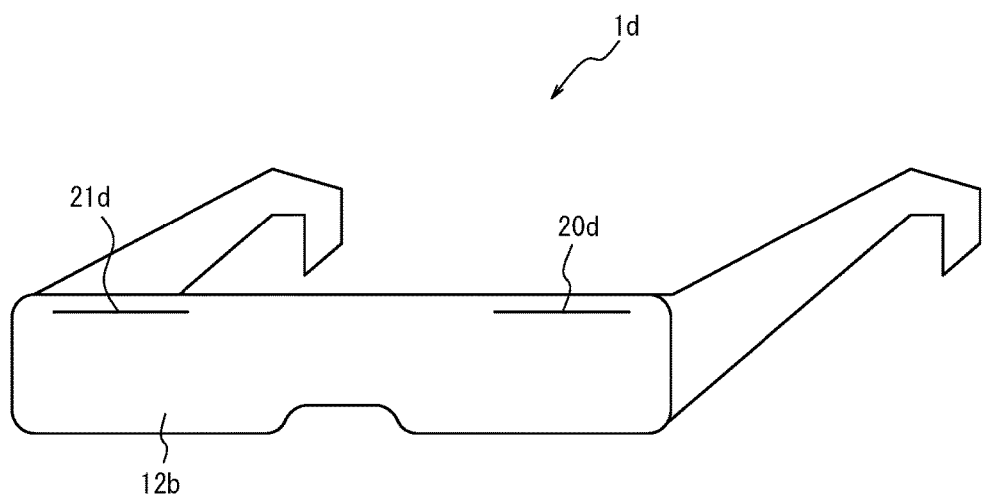
FIG. 7 is a perspective view illustrating the structure of an electronic device in Modification 4 to an embodiment of an electronic device according to this disclosure.

With reference to FIG. 7, the following describes an electronic device in Modification 4 as an embodiment of an electronic device according to this disclosure. FIG. 7 is a perspective view illustrating the structure of an electronic device in Modification 4 as an embodiment of an electronic device according to this disclosure. Modification 4 below only differs from the configuration of the electronic device illustrated in FIG. 1 in the structure of the lens portions 12 and 13 and the antennas 20 and 21. Therefore, only these differences are described.

As illustrated in FIG. 5, in the electronic device 1*d* of Modification 4, the lens portion corresponding to the lens portions 12 and 13 of the embodiment illustrated in FIG. 1 is an integral lens portion 12*b* that is not divided into left and right lenses. The shape of the lens portion 12*b* is not limited to the shape illustrated in FIG. 6 and may be modified as appropriate.

Antennas 20*d* and 21*d* are formed in the electronic device 1*d* of Modification 4, as in the electronic device illustrated in FIG. 1. These antennas 20*d* and 21*d* may be arranged in the same way as the above-described Modifications 1, 2, and 3. In other words, in Modification 4, the antenna 20*d* is used instead of the antenna 20 illustrated in FIG. 1, and the antenna 21*d* is used instead of the antenna 21 illustrated in FIG. 1.

By adopting this configuration, Modification 4 achieves similar effects to those of the electronic device 1 in the above-described embodiment.

The above-described embodiments and modifications may be combined with each other in any logically consistent way. For example, the antenna 21*a* of the configuration in Modification 1 may be adopted in the lens portion 12, and the antenna 20*b* of the configuration in Modification 2 may be adopted in the lens portion 13.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure. For example, the functions and the like included in the various components and steps may be reordered in any logically consistent way. Furthermore, components or steps may be combined into one or divided. While this disclosure has been described focusing on apparatuses, this disclosure may also be embodied as a method or program executed by a processor provided in an apparatus, or as a non-transitory computer-readable recording medium on which a program is recorded. Such embodiments are also to be understood as included in the scope of this disclosure.

The invention claimed is:

1. An electronic device used by being worn on the head of a user, the electronic device comprising:
   a lens portion positioned in front of eyes of the user when the electronic device is worn on the head of the user, the lens portion comprising a first lens portion to be positioned in front of one eye of the user and a second lens portion to be positioned in front of the other eye of the user;
   a first antenna formed in the first lens portion;
   a second antenna formed in the second lens portion;
   a controller;
   a first matching circuit matching the impedance of the first antenna based on a control signal from the controller; and
   a second matching circuit matching the impedance of the second antenna based on a control signal from the controller, wherein
   the first antenna and the second antenna have different functions, and
   the first antenna is a main antenna, and the second antenna is a sub-antenna.

2. The electronic device of claim 1, wherein the first antenna and the second antenna are formed from a transparent electrode film.

3. The electronic device of claim 1, wherein the first antenna is a directional antenna, and the second antenna is an omnidirectional antenna.

4. The electronic device of claim 1, wherein the first antenna is formed around substantially an entire perimeter along an edge of the first lens portion.

5. The electronic device of claim 1, wherein the first antenna is formed at an edge in a direction opposite a direction from the first lens portion towards the second lens portion.

6. The electronic device of claim 1, wherein the first antenna is formed in a corner in a direction opposite a direction from the first lens portion towards the second lens portion.

7. An electronic device used by being worn on the head of a user, the electronic device comprising:
   a lens portion positioned in front of eyes of the user when the electronic device is worn on the head of the user, the lens portion comprising a first lens portion to be positioned in front of one eye of the user and a second lens portion to be positioned in front of the other eye of the user;
   a first antenna formed in the first lens portion;
   a second antenna formed in the second lens portion;
   a controller;
   a first matching circuit matching the impedance of the first antenna based on a control signal from the controller; and
   a second matching circuit matching the impedance of the second antenna based on a control signal from the controller, wherein
   the first antenna and the second antenna have different functions,
   the first antenna is a WAN antenna, and
   the second antenna is a WLAN antenna.

8. The electronic device of claim 7, wherein the first antenna is formed around substantially an entire perimeter along an edge of the first lens portion.

9. The electronic device of claim 7, wherein the first antenna is formed at an edge in a direction opposite a direction from the first lens portion towards the second lens portion.

10. The electronic device of claim 7, wherein the first antenna is formed in a corner in a direction opposite a direction from the first lens portion towards the second lens portion.

11. An electronic device used by being worn on the head of a user, the electronic device comprising:
    a lens portion positioned in front of eyes of the user when the electronic device is worn on the head of the user, the lens portion comprising a first lens portion to be positioned in front of one eye of the user and a second lens portion to be positioned in front of the other eye of the user;

a first antenna formed in the first lens portion;
a second antenna formed in the second lens portion;
a controller;
a first matching circuit matching the impedance of the first antenna based on a control signal from the controller; and
a second matching circuit matching the impedance of the second antenna based on a control signal from the controller, wherein
the first antenna and the second antenna have different functions, and
the lens portion is a colored lens.

12. The electronic device of claim 11, wherein the first antenna is formed around substantially an entire perimeter along an edge of the first lens portion.

13. The electronic device of claim 11, wherein the first antenna is formed at an edge in a direction opposite a direction from the first lens portion towards the second lens portion.

14. The electronic device of claim 11, wherein the first antenna is formed in a corner in a direction opposite a direction from the first lens portion towards the second lens portion.

* * * * *